United States Patent [19]

Ueki

[11] 3,896,398

[45] July 22, 1975

[54] DRIVER CIRCUIT FOR PULSE MODULATION OF A SEMICONDUCTOR LASER

[75] Inventor: Atsufumi Ueki, Tokyo, Japan

[73] Assignee: Nippon Electric Company, Limited, Tokyo, Japan

[22] Filed: Nov. 5, 1973

[21] Appl. No.: 413,152

[30] Foreign Application Priority Data

Nov. 10, 1972 Japan .............................. 47-113208

[52] U.S. Cl. .......... 332/7.51; 331/94.5 PE; 307/312; 307/270

[51] Int. Cl. .............................................. H01s 3/09

[58] Field of Search ............ 332/7, 51, 9 R, 9 T, 38; 331/94.5 PE; 307/312, 264, 268, 270, 265, 267; 250/199; 328/119, 120

[56] References Cited

UNITED STATES PATENTS

| | | | |
|---|---|---|---|
| 3,478,280 | 11/1969 | Fenner | 332/7.51 |
| 3,483,383 | 12/1969 | Konnerth | 250/199 |
| 3,784,844 | 1/1974 | McGrogan | 307/270 |

OTHER PUBLICATIONS

Lanza, "Method . . . of an Inspection Laser," 8/64, pp. 262, IBM Tech. Disc. Bull.

Nishizawa, "Optoelectronics Goes Digital," 12/11/67, pp. 117–122, Electronics.

Konnerth et al., "Delay Between Current . . . Inspection Laser," 4/1/64, A. P. L. Vol. 4, No. 7, QC-1-A745.

*Primary Examiner*—Maynard R. Wilbur
*Assistant Examiner*—N. Moskowitz
*Attorney, Agent, or Firm*—Sughrue, Rothwell, Mion, Zinn and Macpeak

[57] ABSTRACT

A pulse modulation driver circuit for a semiconductor laser is disclosed which discriminates among input pulse signals composed of binary codes to detect the occurrence of a pulse having a code of "1" following a pulse having a code of "0". Detection of this pattern is used to control the driver to increase either or both the width or peak value of the pulse having a code of 1. The effect of this is to eliminate a pattern effect in the light emitted by the semiconductor laser caused by an attenuation of the population inversion in the laser.

7 Claims, 8 Drawing Figures

DRIVER CIRCUIT FOR PULSE MODULATION OF A SEMICONDUCTOR LASER

BACKGROUND OF THE INVENTION

1. Field of the Invention

This invention relates to a driver circuit for the direct current pulse modulation of a semiconductor laser used for optical communication or optical information processing.

2. Description of the Prior Art

In order to pulse-modulate the output light of a semiconductor laser, it has been the practice to directly control the driving current of the semiconductor laser. More specifically, the output light pattern corresponding to input pulse signals composed of the binary codes 0 and 1 is produced by applying current to the semiconductor laser only when the pulse code is 1. It has recently been experimentally revealed, however, that in using this method a pattern effect arises in which the intensity of the output light pulses of the semiconductor laser varies depending on the pattern of the pulse signals when the pulse repetition frequency of the pulse signals becomes high, i.e., the pulse width becomes narrow. In order to reduce this pattern effect, two different procedures have been adopted. One procedure is to make the peak value of the pulse driving current large. The alternative procedure is to superpose a DC component on the pulses applied as the driving current. However, these procedures have not been entirely satisfactory for the reasons that it is technically and economically disadvantageous to generate pulses of a large peak value at a high pulse repetition frequency and that the operating state of the semiconductor laser is severe under conditions of a superposed DC component causing a decrease in reliability. Moreover, the reduction of the pattern effect resulting from the use of these procedures has not been satisfactory.

SUMMARY OF THE INVENTION

An object of this invention is to provide a driver circuit for pulse modulation of a semiconductor laser with which the pattern effect does not appear to the output light pulses of the semiconductor laser.

Another object of this invention is to provide a driver circuit for pulse modulation of a semiconductor laser which does not require a large current drive which thereby lowers the reliability of the semiconductor laser.

In accordance with this invention, there is provided a driver circuit for pulse modulation of a semiconductor laser which comprises means to discriminate among pulse input signals composed of the binary codes, a pulse of the code 1 following a pulse of the code 0, and means to expand either or both the pulse width or the peak value of a pulse of the code 1 following a pulse of the code 0. The output of the pulse width modulating means is applied to the semiconductor laser.

The semiconductor laser in this invention gives rise to a population inversion in its active region when a current is injected thereinto. When the quantity of the population inversion exceeds a certain threshold value, the light gain produced by the population inversion overcomes a loss within the laser resonator, and the semiconductor laser oscillates. When the injection of the current stops, the population inversion is reduced by various relaxation mechanisms, and the oscillation stops. It is, therefore, possible to obtain a pulse light output by applying a pulse current to the seemiconductor laser. In this respect, however, the influence of the survival of the population inversion caused by the preceding pulse is superposed on the population inversion caused by a particular pulse when the pulse repetition frequency becomes high. For this reason, earlier pulses of the pulse train change the wave forms of the light pulses. In more detail, the inverted population at the moment the pulse current is applied is a maximum when the preceding pulses have consecutively been 1, and is a minimum when the preceding pulses have consecutively been 0. It takes an intermediate value in case of any other pulse pattern. Note should here be taken of the fact that since the attenuation of the inverted population is exponential, the attenuation depends greatly on the just preceding pulse whereas it is little influenced by the codes of earlier preceding pulses. Accordingly, the application of a pulse current causes the inverted population to reach the threshold value and starts the oscillation at once when the preceding pulse is 1, while it does not readily reach the threshold value, and the oscillation starting time is delayed when the preceding pulse is 0. As a result, not only jitters arise in the output light pulse, but also the peak values and the pulse widths fluctuate. Therefore, in order to prevent the wave form of the light pulse from being changed by the earlier puslses of the pulse train, this invention employs in combination, means to discriminate the earlier pulses of the pulse train, and means to modulate the waveform of the current pulse for application to the semiconductor laser by the use of the discriminated result. More specifically, in the case where a pulse just preceding a pulse having a code of 1 is 0, the inverted population at the moment of the application of the pulse current is less than that in the case where the just preceding pulse is 1. Thus, the inverted population difference is compensated in this invention in such a way that the application of the pulse current is started slightly earlier or that the peak value of the pulse for application is enlarged. Then, the inverted population at the time of the pulse application in the prior art can be made constant and independent of the earlier pulses of the train. Consequently, the wave forms of the output light pulses can be held identical without being influenced by the pulse train pattern. The fact that the uniformity of the wave forms as accomplished by this invention can never be completely realized by the prior-art large pulse drive or DC superposition method is apparent from the actual situation of the prior art that the inverted population depends necessarily on the earlier pulses of the pulse train. Besides, it cannot be overlooked that as compared with these prior-art methods, this invention can reduce the mean value of the current applied to the semiconductor laser. The reason is that with the prior-art methods the applied pulse current value becomes higher than is necessary for the pulse code of 1 following another pulse of the code 1 due to the effect of the survival of the inverted population when the applied current value or the superposition DC value is so set as to acquire a sufficient light output for the pulse code of 1 following a pulse of the code 0. As a result, the current flows superfluously in the prior art methods compared with this invention. In a semiconductor laser, the reliability decreases in the extreme as in other semiconductor devices when the operating current is increased. With the driver circuit of this invention, the mean current applied to the semiconductor laser can be decreased as stated above, and hence, the reliability of the semiconductor laser is greatly improved.

BRIEF DESCRIPTION OF THE DRAWINGS

This invention will now be described with reference to the accompanying drawings.

DESCRIPTION OF THE PREFERRED EMBODIMENT

Figure 1:
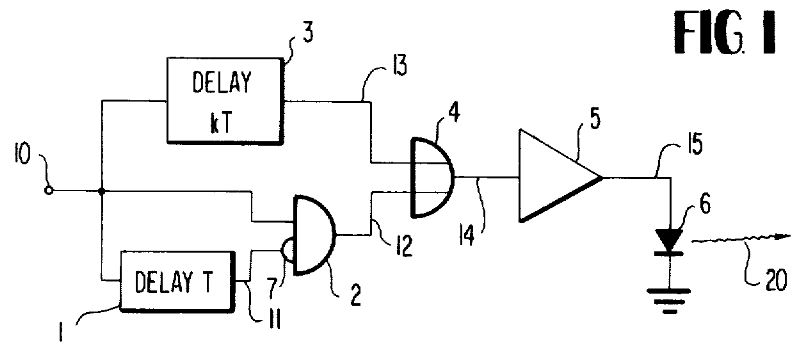
FIG. 1 is a schematic and logic diagram of the pulse modulation driver circuit for a semiconductor laser according to the invention.
Figure 2:
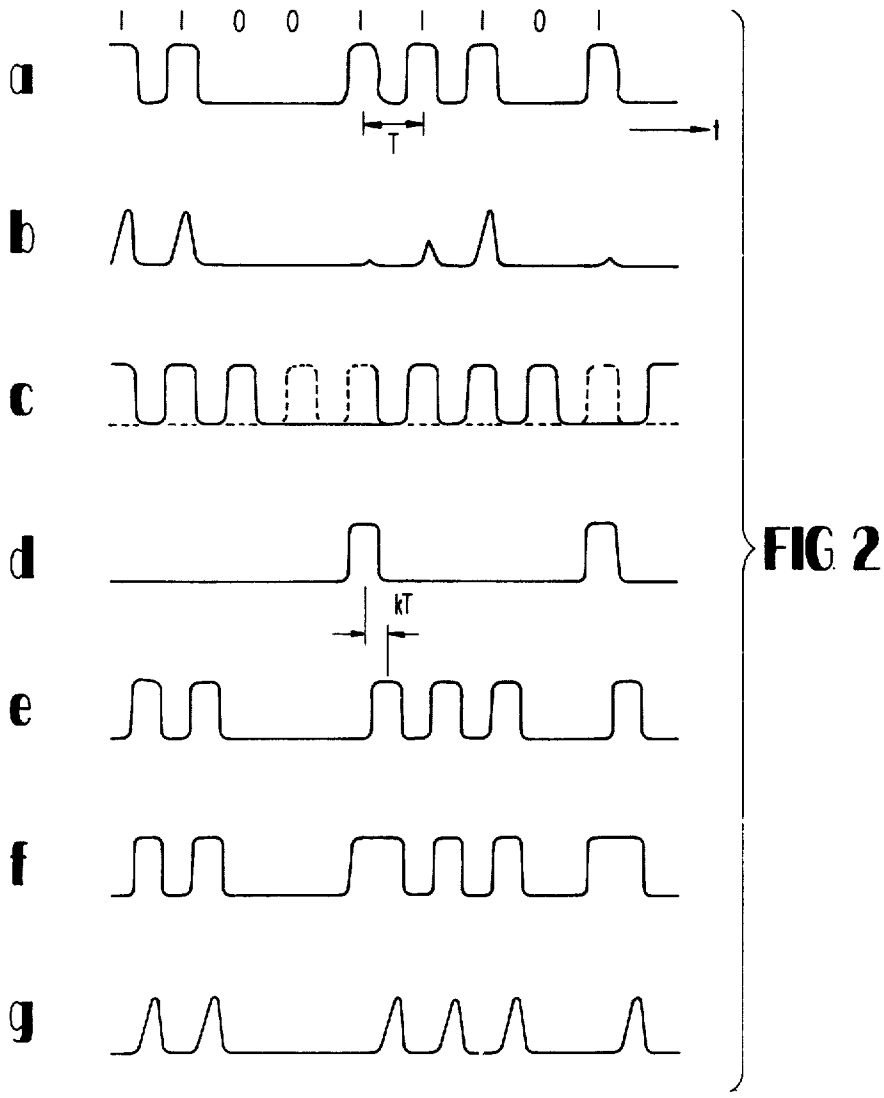
FIGS. 2*a* to 2*g* are timing diagrams illustrating the operation of the driver circuit shown in FIG. 1.

Referring to FIG. 1, the preferred embodiment of this invention comprises delay circuits 1 and 3, an AND circuit 2 with an input inverter 7, an OR circuit 4, an amplifier circuit 5, and a semiconductor laser 6. A pulse signal applied to an input point 10 is processed by the delay circuits 1 and 3, AND circuit 2 and OR circuit 4, and the processed signal is amplified by the amplifier circuit 5. The amplified signal is applied to the semiconductor laser 6, and a light pulse output 20 is obtained. Hereunder, the pulse wave-form processings at various parts will be concretely explained with reference to FIGS. 2*a* to 2*g*. FIG. 2*a* shows a pulse train (in this example, 110011101) having a pulse period T to be applied to the input point 10. Shown in FIG. 2*b* is a waveform of the output light 20 of the semiconductor laser in the case where the pulse train is directly applied to the input point 14 of the amplifier circuit 5. As apparent from the comparison between FIGS. 2*a* and 2*b*, the light pulse outputs are not constant for the pulses having a code of 1. As has already been stated, this is attributed to the differences among the quantities of survival of the population inversion.

In order to eliminate this pattern effect in the light pulse outputs, the circuit illustrated in FIG. 1 processes the input signal applied to the input terminal 10, and provides a waveform different from the waveform shown in FIG. 2*a* to the amplifier circuit 5 as will now be explained. Since the delay circuit 1 has a delay time of T, a waveform at its output point 11 becomes as indicated by a solid line in FIG. 2*c*. The waveform shown in FIG. 2*c* and the input waveform shown in FIG. 2*a* are applied to the AND circuit 2 at the succeeding stage. Since the input of the AND circuit 2 on the side of the delay circuit 1 is provided with the inverter 7, the AND circuit 2 provides an output to point 12 having a waveform as shown in FIG. 2*d* which corresponds to the logical product between the waveform shown in FIG. 2*a* and the negation form (dotted line in FIG. 2*c*) of the waveform shown as the solid line in FIG. 2*c* at the point 11. As is apparent from the comparison with the waveform shown in FIG. 2*a*, the waveform shown in FIG. 2*d* corresponds to the detection of pulses having a code of 1 following a pulse of the code 0. The remaining circuits 3 and 4 perform the processing of expanding the pulse width of the 1 pulse by the use of the detected waveform shown in FIG. 2*d*. The delay circuit 3 delays the input waveform shown in FIG. 2*a* by a fractional period $k \cdot T (k<1$, and $k = 0.4$ in this example). Thus, a waveform at a point 13 becomes as shown in FIG. 2*e*. The OR circuit 4 takes the logical sum between the waveforms shown in FIGS. 2*d* and 2*e* and provides a waveform as shown in FIG. 2*f* at the output point 14. The waveform as shown in FIG. 2*f* is amplified by the amplifier circuit 5, and is applied to the semiconductor laser 6. Then, a pulse having a code of 1 following a pulse having a code of 0 is applied before its normal pulse position in the prior art, so that the inverted population at the normal pulse application time in the prior art becomes the same as in the case of a pulse having a code of 1 following a pulse having the same code of 1. As a consequence, the waveform of the output light 20 can be made uniformly free from the pattern effect as shown in FIG. 2*g*. In order to acquire such uniform light pulse outputs, the delay time $k \cdot T$ of the delay circuit 3 may be adjusted for the control of the inverted population. The most suitable value $k$ depends on the sort of the semiconductor laser 6 and the period T of the pulse train.

Although the amplifier circuit 5 is included in the embodiment in FIG. 1, it is unnecessary if the current value at the point 14 is larger than is required for exciting the semiconductor laser. Furthermore, while the pulses to be applied to the input point 10 are assumed to be return-to-zero pulses in the explanation of the operation taken with FIGS. 2*a* to 2*g*, it is to be understood that they may also be non-return-to-zero pulses. In the latter case, the generation of the stepwise output light pulse having a code of 1 following a pulse having the code 0 is prevented from being delayed.

Of course, this invention is not restricted to the construction of the embodiment in FIG. 1 or the like. It is obvious to those skilled in the art that circuits or methods of arranging elements for producing the waveform as shown in FIG. 2*f* are considered to be almost innumerable. As apparent from the part of the explanation of the principle of this invention, not only whether or not the pulse previous to the pulse having the code of 1 is 0, but also how many pulses having the code of 0 have previously been consecutively existent exerts an influence on the inverted population although this influence is quite diminished. It is possible to count the number of the consecutively generated pulses having the code of 0 to thereby control the extent of the expansion of the pulse width of a following pulse having a code of 1. In particular, this method is effective in order to sufficiently eliminate the pattern effect when the pulse repetition period is short. Needless to say, when adopting such a system, there are a number of circuits and methods of arranging elements. Furthermore, since the principle of this invention consists in compensating the insufficiency of the inverted population at the application of a pulse having the code of 1 following a pulse having the code 0, the manner of the compensation is not restricted to the system of applying the 1 pulse earlier as in the embodiment in FIG. 1, but a system of making the peak value large for only such pulses can also be employed although the light pulse output wave form might change to some extent. Such a system can be realized by, for example, combining the waveform shown in FIG. 2*d* and the waveform shown in FIG. 2*a* at a suitable ratio by addition. It can be easily performed with a resistance network, etc. Of course, both the pulse width and the peak value may be enlarged. In many circuits, the pulse peak value increases with the pulse width expansion in the case of a high repetition frequency. As will be understood from the foregoing explanation, however, this does not become any special obstacle.

It will be apparent that the embodiment shown is only exemplary and that various modifications can be made in construction and arrangement within the scope of the invention as defined in the appended claims.

I claim:

1. A pulse modulation driver circuit for a semiconductor laser, comprising:

a. means for receiving input pulse signals composed of binary codes wherein the code for the presence of output light of the laser is 1 while the code for the absence of light is 0;

b. means connected to said receiving means for discriminating among the input pulse signals to detect the occurrence of a pulse having a code of 1 following a pulse having a code of 0;

c. means connected to said receiving means and controlled by said discriminating means for modulating the detected pulse to increase the average driving current to said laser whereby the intensity of an output light pulse of said semiconductor laser corresponding to a pulse signal having a code of 1 is independent of a preceding pulse signal.

2. A pulse modulation driver circuit for a semiconductor laser as recited in claim 1 wherein said modulating means increases the width of said detected pulse sufficient to cause a population inversion in said semiconductor laser that results in a uniform light output for every input pulse signal having the code of 1 .

3. A pulse modulation driver circuit for a semiconductor laser as recited in claim 2 wherein said discriminating means comprises:

a. delay means connected to said receiving means for delaying said input pulse signals by one pulse period;

b. inverting means connected to the output of said delay means; and c. an AND circuit means connected to receive as inputs the input pulse signals from said receiving means and the output of said inverting means.

4. A pulse modulation driver circuit for a semiconductor laser as recited in claim 3 wherein said modulation means comprises:

a. second delay means connected to said receiving means for delaying said input pulse signals by less than one pulse period; and b. an OR circuit means connected to receive as inputs the outputs of said second delay means and said AND circuit means.

5. A pulse modulation driver circuit for a semiconductor laser as recited in claim 1 further comprising an amplifying means connected to receive the output of said modulating means for providing driving current to said semiconductor laser.

6. A pulse modulation driver circuit for a semiconductor laser as recited in claim 1 wherein said modulating means increases the peak value of said detected pulse sufficient to cause a population inversion in said semiconductor laser that results in a uniform light output for every input pulse signal having the code of 1.

7. A pulse modulation driver circuit for a semiconductor laser as recited in claim 1 wherein said modulating means increases both the width and peak value of said detected pulse sufficient to cause a population inversion in said semicondcutor laser that results in a uniform light output for every input pulse signal having the code of 1.

* * * * *

UNITED STATES PATENT OFFICE
CERTIFICATE OF CORRECTION

PATENT NO. : 3,896,398
DATED : July 22, 1975
INVENTOR(S) : Atsufumi UEKI

It is certified that error appears in the above-identified patent and that said Letters Patent are hereby corrected as shown below:

IN THE SPECIFICATION:

Column 1, line 42, after "appear" delete "to" and insert -- in --.

Column 2, line 44, before "train" insert -- pulse --.

Column 4, line 65, after "high" insert -- pulse --.

Signed and Sealed this

*twenty-eight* Day of *October 1975*

[SEAL]

*Attest:*

RUTH C. MASON
*Attesting Officer*

C. MARSHALL DANN
*Commissioner of Patents and Trademarks*